UNITED STATES PATENT OFFICE.

KURT DESAMARI, OF ELBERFELD, AND ARTHUR ZART, OF VOHWINKEL, GERMANY, ASSIGNORS TO FARBENFABRIKEN VORM. FRIEDR. BAYER & CO., OF ELBERFELD, GERMANY, A CORPORATION OF GERMANY.

DISAZO DYE.

1,052,136.     Specification of Letters Patent.     Patented Feb. 4, 1913.

No Drawing.     Application filed July 27, 1911. Serial No. 640,780.

*To all whom it may concern:*

Be it known that we, KURT DESAMARI and ARTHUR ZART, doctors of philosophy, chemists, citizens of the German Empire, residing, respectively, at Elberfeld, Germany, and Vohwinkel, near Elberfeld, Germany, have invented new and useful Improvements in New Disazo Dye, of which the following is a specification.

The present invention relates to the manufacture and production of new azo coloring matters having most probably the following general formula:

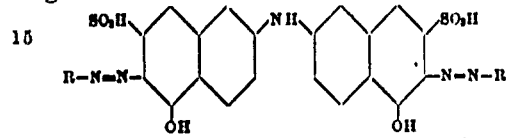

R meaning a derivative of the 2-amino-5-naphthol-7-sulfonic acid containing a heteronuclear ring:

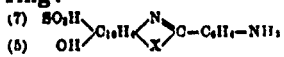

X meaning —NH—, which may be replaced by —O—, and —S—.

The new dyes are obtained by combining the diazo compounds prepared from aminophenyl-5-oxy-2-naphthimidazol-7-sulfonic acids:

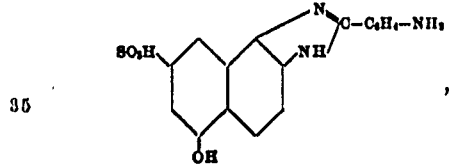

aminophenyl - 5 - oxy - 2 - naphthoxazol-7-sulfonic acids:

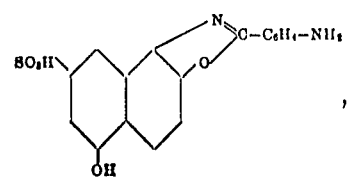

aminophenyl - 5 - oxy - 2 - naphthothiazol-7-sulfonic acids:

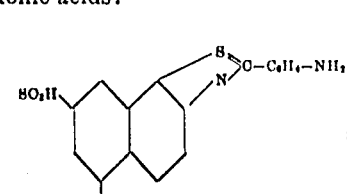

with the 5.5'-dioxy-2.2'-dinaphthylamin-7.7'-disulfonic acid:

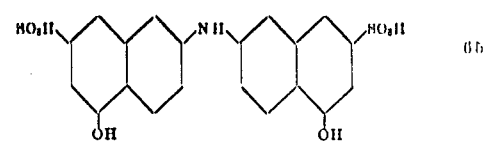

Of course two different molecules of these compounds can be used.

The new dyes having most probably the formula:

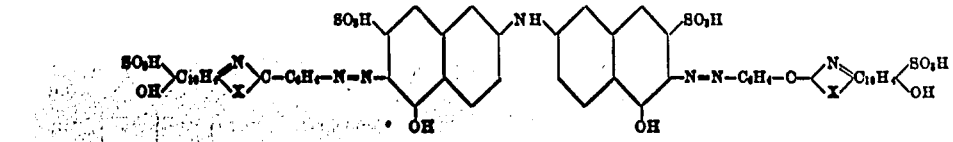

are after being dried and pulverized in the shape of their alkaline salts dark powders soluble in water; yielding upon reduction with stannous chlorid and hydrochloric acid a derivative of 2-amino-5-naphthol-7-sulfonic acid containing a heteronuclear ring:

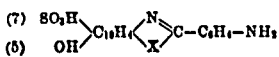

and a compound of the formula:

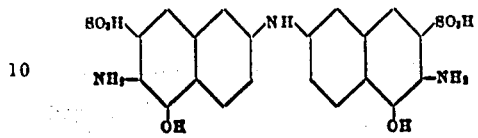

dyeing cotton from red to bluish-red shades which on being developed with diazotized para-nitranilin change into shades fast to washing and capable of being discharged to a pure white.

The following example may further illustrate the invention, the parts being by weight:—750 parts (2 mol.) of para-aminophenyl-5-oxy-1.2-naphthoxazol-7-sulfonic acid are diazotized with 140 parts of sodium nitrite and hydrochloric acid and combined with 461 parts of 5.5'-dioxy-2.2'-dinaphthylamin-7-7'-disulfonic acid containing an excess of bicarbonate of sodium. After some time the mixture is heated and the dye is salted out with common salt, filtered off and dried.

The new dye having most probably the formula:

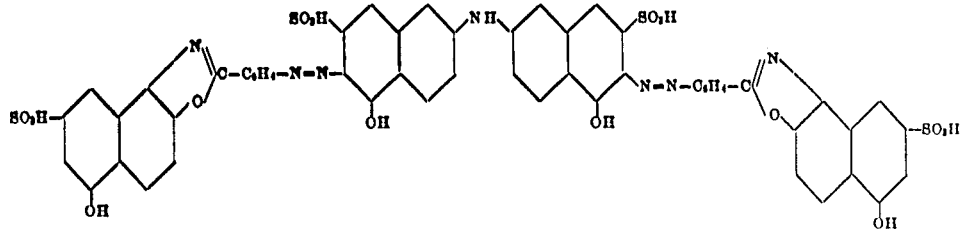

is in the shape of its sodium salt a dark powder which is easily soluble in water with a reddish-violet coloration and which is soluble in concentrated sulfuric acid with a bluish-red coloration. Upon reduction with stannous chlorid and hydrochloric acid it is split up into 2-para-aminophenyl-5-oxy-1.2-naphthoxazol-7-sulfonic acid and the 6.6'-diamino-2.2'-dinaphthylamin-5.5'-dioxy-7.7'-disulfonic acid. It dyes cotton violet. The shade after being developed with diazotized para-nitranilin is red-violet fast to washing. It can be discharged to a pure white.

Meta-aminophenyl derivatives of the above mentioned heteronuclear compounds of 2.5.7-aminonaphthol sulfonic acids can be used.

We claim:—

1. The herein described new disazo dyestuffs having most probably the formula:

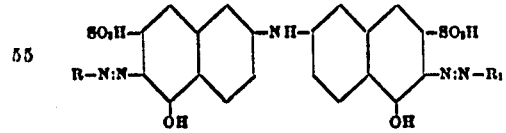

where R and R₁ are derivatives of 2-amino-5-naphthol-7-sulfonic acid containing heteronuclear rings, which are after being dried and pulverized in the shape of their alkaline salts dark powders soluble in water; yielding upon reduction with stannous chlorid and hydrochloric acid a derivative of 2-amino-5-naphthol-7-sulfonic acid containing a heteronuclear ring and a compound of the formula:

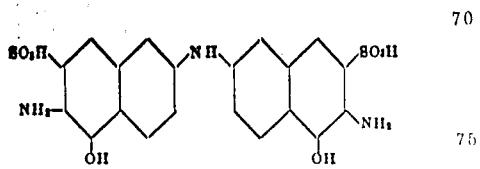

dyeing cotton from red to bluish-red shades which on being developed with diazotized para-nitranilin change to shades fast to washing and capable of being discharged to a pure white, substantially as described.

2. The herein described new dye having most probably the formula:

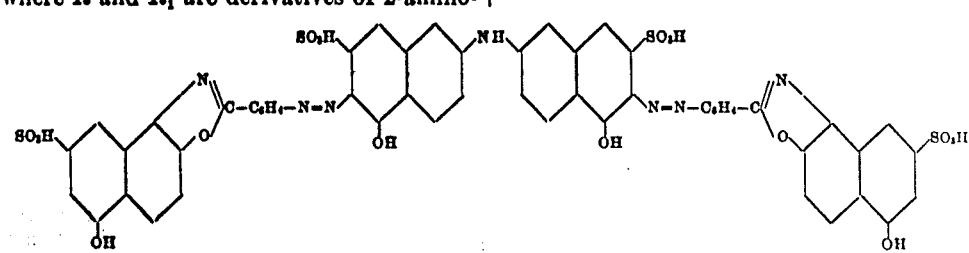

which is after being dried and pulverized in the shape of its sodium salt a dark powder soluble in concentrated sulfuric acid with a bluish-red coloration; yielding upon reduction with stannous chlorid and hydrochloric acid para-aminophenyl-5-oxy-1.2-naphthoxazol-7-sulfonic acid and 6.6′-diamino-2.2′-dinaphthylamin-7.7′-disulfonic acid, dyeing cotton violet, which shade after being developed with diazotized para-nitranilin is red-violet fast to washing which can be discharged to a pure white, substantially as described.

In testimony whereof we have hereunto set our hands in the presence of two subscribing witnesses.

KURT DESAMARI. [L. S.]
ARTHUR ZART. [L. S.]

Witnesses:
ALBERT F. NUFER,
LOTTE BECKMANN.